United States Patent Office 3,539,312
Patented Nov. 10, 1970

3,539,312
SMOKE SUPPRESSANT FUEL COMPOSITION
George W. Eckert and Doris Love, Wappingers Falls, and James G. Dadura, Fishkill, N.Y., assignors to Texaco Inc., New York, N.Y., a corporation of Delaware
No Drawing. Continuation-in-part of application Ser. No. 625,621, Mar. 24, 1967. This application Oct. 25, 1968, Ser. No. 770,781
Int. Cl. C10l 1/24
U.S. Cl. 44—76
9 Claims

ABSTRACT OF THE DISCLOSURE

Smoke inhibited light distillate fuel composition comprising a hydrocarbon distillate fuel containing smoke suppressing amounts of calcium sulfonate in conjunction with either calcium hydroxide or a calcium alcoholate and method of operating an engine on a smoke suppressing fuel.

This application is a continuation-in-part of application Ser. No. 625,621, filed Mar. 24, 1967, and now abandoned.

This invention relates primarily to a light distillate fuel composition which has been treated to suppress or reduce the formation of smoke in the combustion of the fuel. The invention also relates to a method of operating an engine in such a manner that there is a minimum of harmful, obnoxious smoke in the engine exhaust.

Diesel and turbine or jet engines, which burn light distillate fuels, tend to discharge substantial quantities of smoke in their exhaust gases. This exhaust smoke is particularly objectionable because of the very substantial pollution load which is continuously being added to the atmosphere. This has been of such concern that the operation of diesel-powered trains and trucks have come under strict regulation in many places with regard to when and where they may be operated and how much smoke can be discharged in the exhaust. To date, turbine engines are not similarly affected but a practical solution to a serious air pollution problem is obviously essential.

With regard to diesel operation and their exhaust, smoke suppressants have been employed in or added to diesel fuel oils patricularly when the diesel engines are being operated in areas of high population density. In general, the most common smoke suppressants employed are the organic compounds of barium, particularly the barium-carbonate-overbased barium sulfonates, which are effective for substantially reducing the amount of smoke exhaust from a diesel engine. However, there are serious questions concerning the use of barium compounds as smoke suppressants. It is known that all of the common barium compounds are poisonous to human beings. The use of barium compounds in diesel fuel compositions and the discharge thereof in the exhaust gases of the diesel engine is considered by some experts to be introducing a health hazard to the atmosphere which may, in fact, be more harmful than the diesel smoke exhaust itself. Calcium compounds, particularly calcium carbonate overbased calcium sulfonate have been proposed to replace the barium carbonate overbased barium compounds in diesel fuels. However, the calcium carbonate overbased calcium additives have not enjoyed any appreciable degree of use because of a number of serious disadvantages connected with their use.

The ineffectiveness of the calcium carbonate overbased calcium sulfonate is shown by the results in Table A below:

TABLE A
[Smoke reduction by $CaCO_3$ and $BaCO_3$ overbased sulfonates]

| Additives | Percent metal in fuel | Smoke reduction, percent Petter engine | Smoke reduction, percent GM 3-71 engine |
|---|---|---|---|
| $BaCO_3$ Overbased Ba sulfonate | 0.17 Ba | 51 | |
| $BaCO_3$ Overbased Ba sulfonate | 0.10 Ba | 50 | |
| $CaCO_3$ Overbased Ca sulfonate (11/1) | .17 Ca | 9 | |
| $CaCO_3$ Overbased Ca sulfonate | .072 Ca | | 6 |

A novel fuel composition and a method of operating a diesel or turbine engine have now been discovered whereby fuel compositions containing an overbased (but non-$CaCO_3$ overbased) sulfonate additive is effective to provide a substantial suppression of the exhaust smoke and at the same time overcome serious operating disadvantages experienced with the earlier use of calcium compounds.

In accordance with this invention, a hydrocarbon light distillate fuel oil composition is provided containing minor amounts of a calcium sulfonate and an overbasing component represented by the formula:

$$Ca[O(R'O)_yR]_z$$

in which R represents nil, hydrogen or an alkyl radical having from 1 to 10 carbon atoms, R' is an alkylene radical having from 2 to 4 carbon atoms, y has a value from 0 to 4, z has a value of 1 when R is nil, and z has a value of 2 when R is H or alkyl. It is an important feature of this fuel composition that it give a substantial reduction of smoke emissions without adding harmful or poisonous materials to the exhaust smoke and without causing any substantial loss of horsepower output due to the use of the additive. The method of the invention comprises operating an engine by burning a hydrocarbon light distillate fuel therein containing smoke suppressing amounts of the above-noted additive combination.

The compositions of the additive combination of the invention is critical. The calcium sulfonate must be employed in combination with calcium hydroxide or a calcium alcoholate. Other calcium compounds while possibly equivalent in some applications do not provide a satisfactory level of smoke reduction and/or cause a substantial reduction in the horsepower of the engine.

The calcium sulfonate can be a petroleum sulfonate or a synthetic sulfonate such as didodecylbenzene sulfonate. Petroleum sulfonic acid is generally produced by the treatment of a suitable petroleum hydrocarbon fraction with sulfuric acid according to methods well known to the art. For example, a petroleum base oil is gradually treated with incremental amounts of fuming sulfuric acid. After the desired amount of sulfuric acid has been added to the oil to effect a reaction, the sludge which forms is removed and the acid-treated oil containing dissolved sulfonic acids is neutralized with a solution of sodium hydroxide. The aqueous alkalized solution is removed from the mixture and the sodium salts of petroleum sulfonic acid extracted with alcohol. The alcohol is then separated from the extracted layer by distillation or other suitable means. The sodium petroleum sulfonate is converted to calcium petroleum sulfonate by treating with calculated amounts of a calcium compound, such as calcium chloride, and the like. Alternatively, the calcium sulfonate could be made by neutralization of the sulfonic acid by calcium hydroxide. The calcium sulfonate could be made also by reaction of ammonium sulfonate with calcium hydroxide to liberate $NH_3$ and $H_2O$.

The calcium sulfonate must be employed in conjunction with a base reacting or basic calcium component selected from the group consisting of calcium hydroxide and calcium alcoholates represented by the formula:

$$Ca[O(R'O)_yR]_z$$

in which R represents nil, hydrogen or an alkyl radical having from 1 to 10 carbon atoms, R' is an alkylene radical having from 2 to 4 carbon atoms, y has a value from 0 to 4, z has a value of 1 when R is nil, and z has a value of 2 when R is H or alkyl. A preferred class of overbasing components are represented by the above formula in which R is hydrogen or an alkyl radical having from 1 to 2 carbon atoms and y has a value from 0 to 1. Calcium hydroxide is the preferred base forming material followed by the calcium alcoholates including calcium 2-methoxyethoxide, calcium butoxide, calcium propoxide, calcium ethoxide, calcium 2-butyoxyethoxide, calcium 2-(2-ethoxy-ethoxy) ethoxide, and the like. Since calcium is divalent, mixed compounds are possible wherein one of the valences is satisfied by a sulfonate radical and the other by a hydroxyl group or an alcoholate radical of the type disclosed in the above formula. It will be appreciated that two moles of such a mixed compound are chemically equivalent to a mole of calcium sulfonate and a mole of the corresponding basic compounds taken together. This invention is intended to cover such mixed calcium compounds. Surprisingly, other calcium overbasing components, such as calcium carbonate and calcium borate do not cooperate with calcium sulfonate to give an adequate reduction of smoke emissions. The overbasing components, calcium carbonate and calcium borate, are also unsatisfactory because they cause a lower power output.

The overbased calcium additives are employed in the light distillate fuel to provide a concentration of total calcium in the fuel ranging from about 0.02 to 0.2 weight percent calcium. Lesser amounts of the smoke suppressing additives impart no significant improvement in the smoke suppression properties of the fuel. The calcium sulfonate and the overbasing component can be prepared as a mixture but need not be employed in equivalent amounts. The preferred proportions range from 0.1 to 1 mole of the overbasing component per mole of calcium sulfonate.

The smoke suppressant additive of the invention is employed in light distillate fuels, such as turbine and diesel fuels, mixtures of hydrocarbons broadly boiling in the range from about 125° F. to about 700° F. The preferred fuels are those boiling in the range from about 300 to 650° F. The additive is readily soluble in hydrocarbon fuel oil compositions at the concentrations employed and can be mixed into the fuel in any convenient way.

The effectiveness of the smoke suppressant fuel and method of the invention was determined by burning untreated fuel and additive-containing fuel in diesel engines and measuring the smoke in the exhaust. The engines employed in this test were a four-cycle one cylinder Petter engine with a 16.5:1 compression ration and an open combustion chamber and a two-cycle three cylinder GM 3-71 engine with a 17/1 compression ratio and an open combustion chamber. The intensity of the exhaust smoke was determined by passing a beam of light through the full flow of exhaust gases to a photoelectric cell on the opposite side of the exhaust pipe. A scale of 0 to 100 on an ammeter was used to give a measure of the smoke intensity. A reading of 0 corresponded to complete light transmission and a reading of 100 to complete light extinction. The tests were conducted using a diesel fuel having the following properties and inspection values:

Gravity _____ 37.2
Sulfur _____ 0.10

ASTM Distillation:
IBP _____ 368° F.
10% _____ 438° F.
50% _____ 512° F.
90% _____ 574° F.
EP _____ 610° F.

The percent smoke reduction for the various additive components is set forth in Table I below:

TABLE I
[Percent smoke reduction employing calcium compounds in diesel fuel at 0.072% calcium]

| Runs | Additive | Mol ratio | Smoke reduction, percent Petter engine | Smoke reduction, percent GM 3-71 engine |
|---|---|---|---|---|
| (1) | Calcium sulfonate | | [1]43 | |
| (2) | {Calcium sulfonate / Calcium carbonate} | 1 / 0.2 | [1]40 | |
| (3) | {Calcium sulfonate / Calcium carbonate} | 1 / 1½ | | 6 |
| (4) | Calcium octoate | | [1]44 | |
| (5) | {Calcium sulfonate / Calcium hydroxide} | 1 / 0.2 | 56 | 61 |
| (6) | {Calcium sulfonate / Calcium 2-methoxy ethoxide} | 1 / 1 | 49 | 55 |
| (7) | {Calcium sulfonate / Calcium borate} | 1 / 1 | [1]35 | |
| (8) | {Calcium sulfonate / Calcium carbonate} | [2]1 / [2]11 | [1]27 | |
| (9) | {Calcium sulfonate / Calcium carbonate} | [3]1 / [3]11 | 19 | |

[1] Substantially reduced engine horsepower as compared to horsepower output of non-additive fuel.
[2] At .14% Ca in fuel.
[3] At .05% Ca in fuel.

Runs 5 and 6 represent the present invention showing additive combinations of calcium sulfonate with calcium hydroxide or calcium 2-methoxy ethoxide giving a high percentage of smoke reduction with no loss in engine horsepower. Calcium sulfonate alone or in combination with calcium carbonate or calcium borate gave low levels of smoke suppression and also caused a substantial reduction in the engine horsepower output as compared to the horsepower output of the nonadditive fuel.

The effect of the additive of the invention on reducing smoke in a turbine or jet fuel was also determined. These tests were conducted using a simulated turbine or jet engine or reduced scale combustor. This combustor was operated under the following conditions:

162 p.s.i.a. air pressure to burner
660° F. air into burner temperature
12,900 lbs. air/hour
160 lbs. fuel/hour
0.0125 fuel/air ratio This exhaust was passed into a Bacharach Smokemeter through filter paper for measured intervals of time and the level of the smoke in the exhaust determined by photoelectric light measurements on the filter paper.

In another test, the exhaust gas was passed through a Millipore filter and the amount of particulate matter in the exhaust determined by the weight differences in the filter before and after passage of the exhaust.

The base turbine fuel, Base Fuel B, employed in these tests had the following inspection tests:

Gravity, °API _____ 43.1
FIA:
   Aromatics _____ 15.0
   Olefins _____ 3.5
   Saturates _____ 81.5
Distillation, ASTM
   IBP _____ 324
   10% _____ 366
   50% _____ 414
   90% _____ 483
   EP _____ 522

The overbased calcium sulfonate employed in the examples below, Additive A, consisted of 0.2 to 1 mole ratio of calcium hydroxide to calcium sulfonate. The results of the tests are given in Table II below:

TABLE II

| Additive | Concentration wt. percent, metal | Combustor test, Bacharach smoke rating | | | Millipore determination, particulate matter, mg./cu. ft. |
|---|---|---|---|---|---|
| | | 30 sec. | 1 min. | 2 min. | |
| None (base fuel B) | None | 8.0 | 8.9 | 9.5 | 1.59 |
| Additive A | 0.01% Ca | 5.8 | 7.2 | 8.3 | 0.60 |

The foregoing table shows a very substantial improvement both in the Smoke Rating and in the Particulate Matter Tests for the additive containing fuels of the invention.

We claim:

1. A fuel composition comprising a mixture of hydrocarbons boiling in the range of 125 to 700° F. and an effective smoke suppressing amount of an overbased calcium additive consisting of calcium sulfonate and an overbasing component represented by the formula:

$$Ca[O(R'O)_y R]_z$$

in which R represents nil, hydrogen or an alkyl radical having from 1 to 10 carbon atoms, R' is an alkylene radical having from 2 to 4 carbon atoms, $y$ has a value from 0 to 4, $z$ has a value of 1 when R is nil and $z$ has a value of 2 when R is hydrogen or alkyl and, in which there is from 0.1 to 1 mole of the overbasing component per mole of calcium sulfonate.

2. A fuel composition according to claim 1 containing from 0.02 to 0.2 weight percent of said calcium additive calculated as calcium.

3. A fuel composition according to claim 1 in which said additive consists of calcium sulfonate and calcium hydroxide.

4. A fuel composition according to claim 1 in which said additive consists of calcium sulfonate and calcium 2-methoxyethoxide.

5. A method for reducing the exhaust smoke of an engine which comprises burning in said engine a light distillate fuel composition containing a mixture of hydrocarbons boiling in the range of 125 to 700° F. and an effective smoke suppressing amount of an overbased calcium additive consisting of calcium sulfonate and an overbasing component represented by the formula $$Ca[O(R'O)_y R]z$$

in which R is nil, hydrogen or an alkyl radical having from 1 to 10 carbon atoms, R' is an alkylene radical having from 2 to 4 carbon atoms, $y$ has a value from 0 to 4, $z$ has a value of 1 when R is nil and $z$ has a value of 2 when R is H or alkyl, and in which there is from 0.1 to 1 mole of the overbasing component per mole of calcium sulfonate.

6. A method according to claim 5 in which said fuel composition contains from 0.02 to 0.2 weight percent of said calcium compounds calculated as calcium.

7. A method according to claim 5 in which said additive consists of calcium sulfonate and calcium hydroxide.

8. A method according to claim 5 in which said additive consists of calcium sulfonate and calcium 2-methoxyethoxide.

9. A method according to claim 5 in which there is from 0.1 to 1 mole of said overbasing component per mole of calcium sulfonate.

References Cited

UNITED STATES PATENTS

| 2,585,520 | 2/1952 | Van Ess et al. | 44—76 |
| 2,695,910 | 11/1954 | Asseff et al. | 44—76 |
| 3,085,866 | 4/1963 | Gay et al. | 44—76 |

DANIEL E. WYMAN, Primary Examiner

W. J. SHINE, Assistant Examiner

U.S. Cl. X.R.

44—57